L. J. ODELL.
Check-Rower.

No. 167,557.

Patented Sept. 7, 1875.

WITNESSES
E. H. Bates
George E. Upshaw.

INVENTOR
L. J. Odell,
Chipman and Fosmire,
ATTORNEYS

UNITED STATES PATENT OFFICE.

LEVI J. ODELL, OF FAIRBURY, ILLINOIS.

IMPROVEMENT IN CHECK-ROWERS.

Specification forming part of Letters Patent No. 167,557, dated September 7, 1875; application filed July 24, 1875.

*To all whom it may concern:*

Be it known that I, LEVI J. ODELL, of Fairbury, in the county of Livingston and State of Illinois, have invented a new and valuable Improvement in Check-Rowers; and I do hereby declare that the following is a full, clear, and exact description of the construction and operation of the same, reference being had to the annexed drawings, making a part of this specification, and to the letters and figures of reference marked thereon.

Figure 1:
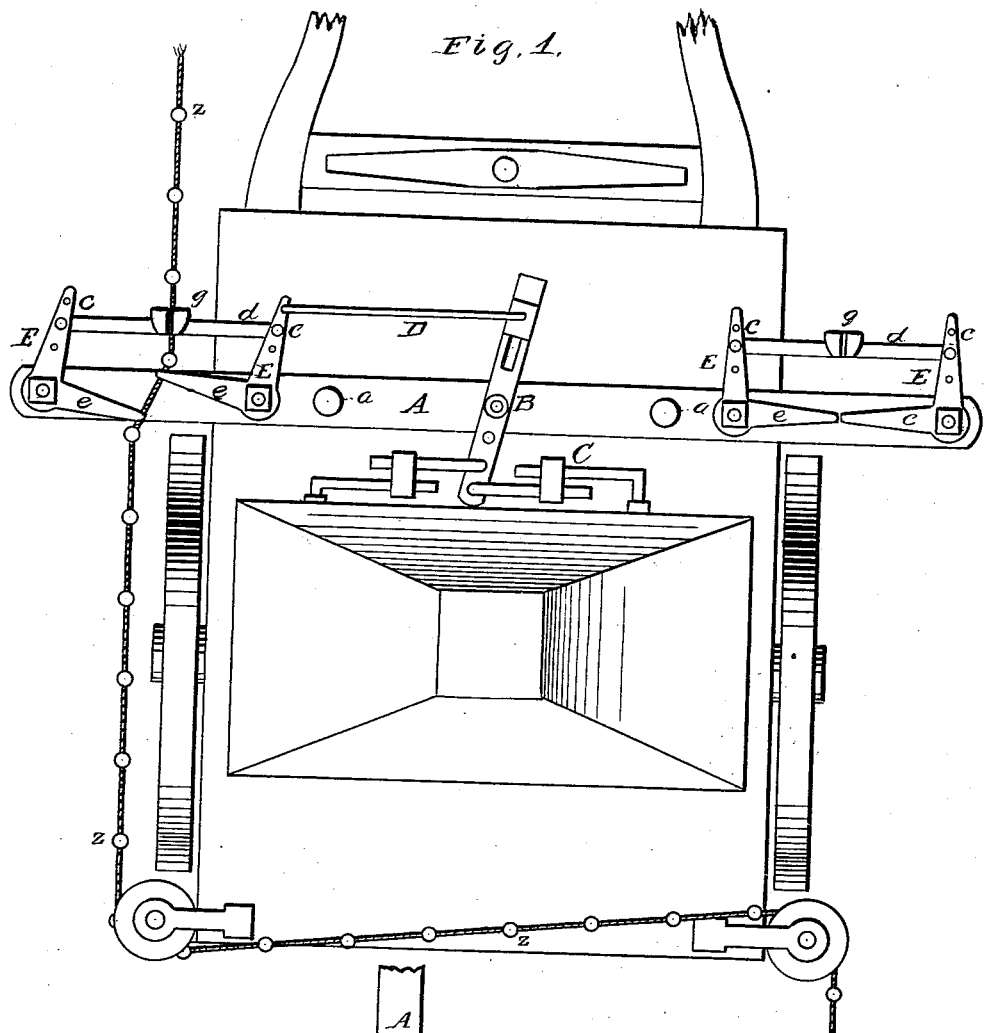
Figure 2:
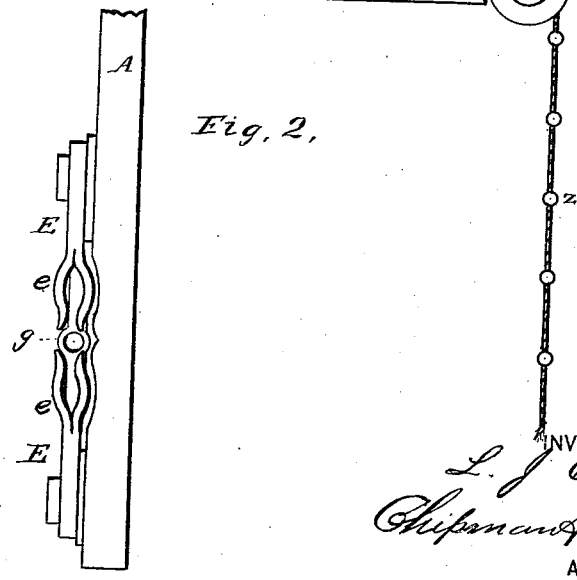

Figure 1 of the drawings is a representation of a plan view of my machine; and Fig. 2 is a detail view thereof.

This invention has relation to the means for automatically dropping corn or seed in checks in the field; and it consists in the construction and novel arrangement of the forked angle-levers and their connecting guide-bar, whereby a rope, provided with knots or buttons at suitable distances apart, and strained across a field, is enabled, as the planter moves forward, to operate the seed-slide, as hereinafter fully shown and described.

In the accompanying drawings, the letter A designates a beam or bar, to which the check-rowing devices are attached, and which is secured to the forward portion of a planter directly over the hoppers or seed-boxes by bolts passing through the perforations $a\ a$, or otherwise, as may be desirable. At the middle of this beam or frame is pivoted a lever, B, one end of which is provided with a series of perforations or other adjustable means of connection for the adjustable rods C, whereby motion is communicated to the seed-slide of the planter. The other end of this center lever is provided with a slot and slide or other adjustable connection for a rod, D. E E represent angle-levers, which are pivoted in pairs at each end of the bar or frame A in such a manner that when their arms $c$, which are connected by the guide-bar $d$, are parallel with each other, their forked arms $e$ will be extended in line with, and toward, each other, the forked ends forming an opening opposite the central portion of the guide-bar, which is provided with a ring or loop, $g$. The arm $c$ of the angle-lever is provided with adjusting perforations for the attachment of the rod D, which extends to the center lever.

This device is operated in the following manner: A rope provided with knots or buttons, as indicated at $z$, is stretched across the field in the line of travel of the planter, being preferably passed around pulleys pivoted to the rear of the frame of the machine. This rope being passed through the ring or eye $g$ of one or the other of the pairs of angle-levers, will catch in the eye in passing through, and draw the angle-levers into an oblique position with the forked end of one closely against said eye. As the knot or button slips through the eye it will catch in the fork of this angle-lever and pull it to the rear, throwing, by means of the guide-bar $d$, the other lever with its forked end forward to the eye $g$ to receive the next knot or button of the rope, and be in turn drawn to the rear. In this manner a vibratory movement is imparted by the rope to the pair of forked angle-levers, and through them to the rod D and central lever B, whereby, through its connecting-rods, motion is imparted to the seed-slide, causing the dropping of the grain with precision and regularity.

Instead of employing a single bar, A, the devices may be attached to the frame of the planter by other means. And the method of connecting the pairs of levers to the seed-slide may be varied.

I do not, therefore, desire to be confined to the precise construction herein shown and described.

What I claim as new, and desire to secure by Letters Patent, is—

In a check-rower for planters, the combination, with a pair of forked crank or angle levers, $c\ e$, of the connecting-bar $d$ and its loop or eye $g$ for the passage of the operating-rope, substantially as specified.

In testimony that I claim the above I have hereunto subscribed my name in the presence of two witnesses.

LEVI J. ODELL.

Witnesses:
 SAML. S. ROGERS,
 T. A. JONES.